March 2, 1926.
A. M. PALMER, SR., ET AL
GOPHER TRAP
Filed July 2, 1925
1,574,847
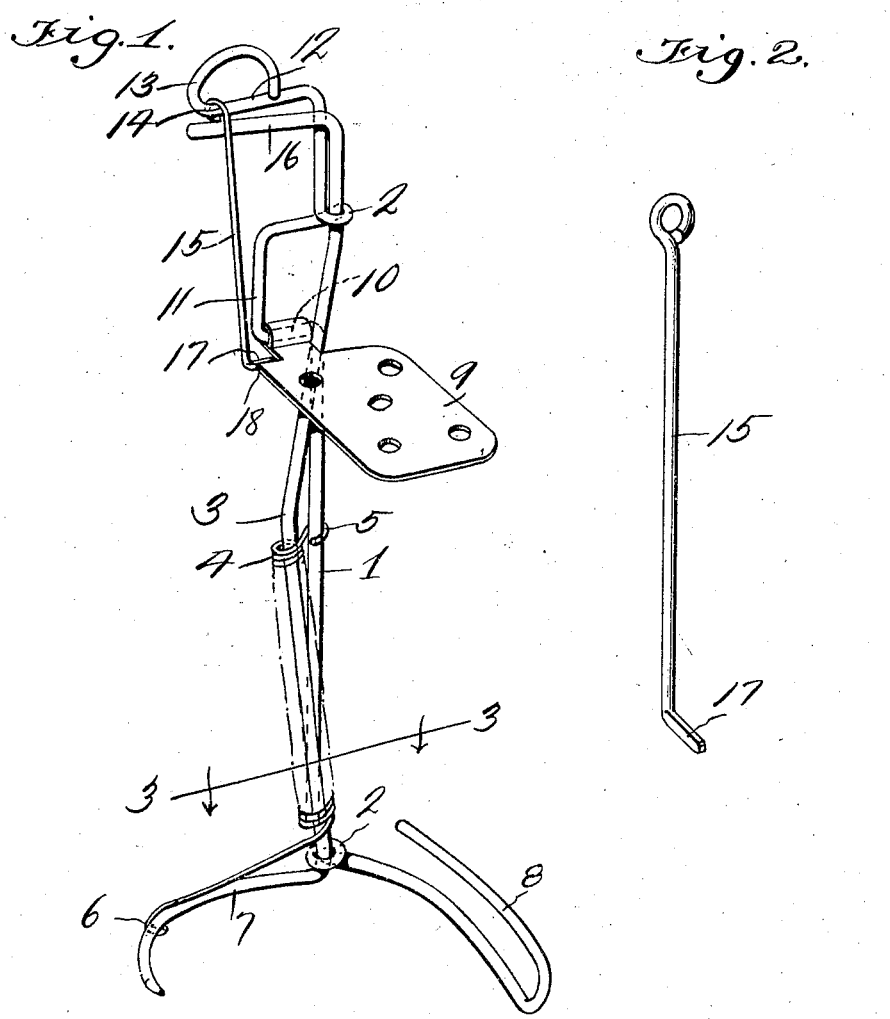
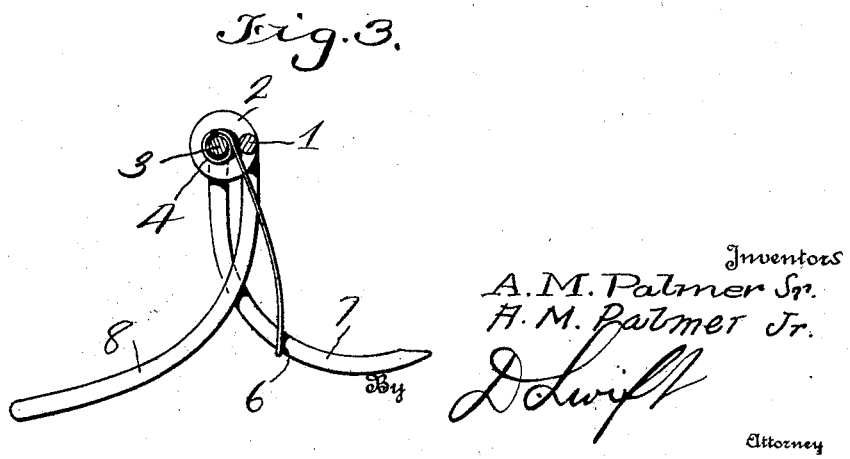
Inventors
A. M. Palmer Sr.
A. M. Palmer Jr.

Patented Mar. 2, 1926.

1,574,847

UNITED STATES PATENT OFFICE.

ALBERT M. PALMER, SR., AND ALBERT M. PALMER, JR., OF LOGAN, IOWA.

GOPHER TRAP.

Application filed July 2, 1925. Serial No. 41,071.

*To all whom it may concern:*

Be it known that we, ALBERT M. PALMER, Sr., and ALBERT M. PALMER, Jr., citizens of the United States, residing at Logan, in the county of Harrison, State of Iowa, have invented a new and useful Gopher Trap; and we do hereby declare the following to be a full, clear, and exact description of the invention, such as will enable others skilled in the art to which it appertains to make and use the same.

The invention relates to gopher traps and has for its object to provide a device of this character which is positive in its operation, formed from two pieces of wire hingedly connected together, and provided with tripping means which is positive in its operation and easily tripped.

A further object is to provide a gopher trap comprising a bar terminating in a U-shaped angularly disposed gripping jaw and spaced eyes in which a rotatable member provided with a gripping jaw is mounted, and the body member with an offset U-shaped portion adjacent its rear eye, on which U-shaped portion is pivotally mounted at a right angle to the body member, an apertured tripping member with a shoulder of which a pivoted arm, carried by the body member cooperates for holding the spring actuated rotatable member in set position by engagement with a shoulder of the tripping member and extending across a right angularly disposed arm of the rotatable member.

A further object is to mount on the rotatable member a coiled spring, one end of which coiled spring is connected to one of the gripping jaws and the other end to the body member, said coiled spring forming means whereby when the device is tripped the jaws will be forced together for gripping the animal.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention, In the drawing:—

Figure 1 is a perspective view of the trap.

Figure 2 is a perspective view of the tripping arm.

Figure 3 is a sectional view taken on line 3—3 of Figure 1, showing the gripping arms in closed positions.

Referring to the drawing, the numeral 1 designates the main body of the trap, which body is bent to form spaced eyes 2 adjacent its ends, and in which eyes is rotatably mounted a rod 3. Surrounding the rod 3 is a coiled spring 4, one end of which is anchored at 5 to the body 1, and the other end at 6 to the curved angularly disposed gripping arm 7 of the rotatable rod 3, therefore it will be seen that the coiled spring 7 will normally exert a pressure on the arm 7 for forcing the same towards the curved U-shaped gripping arm 8 carried by the body member 1, and disposed in a plane substantially at a right angle to said body. The device is adapted to be disposed in a gopher hole or in any other position, and is tripped by the animal coming in engagement with the apertured tripping plate 9. The tripping plate 9 is pivotally mounted on an angularly disposed arm 10 disposed at substantially a right angle to the body member 1 and carried by the U-shaped offset portions 11 thereof. Body 1 terminates at one of its ends in a right angularly disposed arm 12 to the same side thereof, and in substantially the same plane as the U-shaped offset portion 11, and is provided with an eye 13, to which a chain or other securing means may be attached for anchoring the trap. Pivotally connected at 14 to the eye 13 is a tripping arm 15. The arm 15 extends across the angularly disposed arm 16 carried by the rotatable rod 3 and holds the same in a position where the jaws 7 and 8 will be spread apart as shown in Figure 1, and the coiled spring 4 tensioned. Tripping arm 15 at its free end is provided with a flattened angularly disposed arm 17, which engages under the shoulder 18 of the tripping plate 9, and holds the jaws 7 and 8 in open position. It will be seen that when an animal comes into engagement with the tripping plate 9 with its body between the gripping arms 7 and 8, the tripping arm 15 will be released, thereby releasing the rotatable rod 3 and allowing the gripping arms 7 and 8 to be forced towards each other under the influence of the coiled spring 4 for gripping and holding the animal.

From the above it will be seen that a gopher trap is provided which is formed substantially from two pieces of relatively heavy wire bent to form cooperating gripping arms, spaced eyes in which one of the members is rotatably mounted and a U-shaped portion 11 on which is pivotally mounted the tripping plate 9. It will also be seen that the device is positive in its operation, and it will easily and quickly trip, thereby insuring a maximum trapping capacity.

The invention having been set forth what is claimed as new and useful is:—

1. A trap comprising a body member having spaced eyes, an angularly U-shaped gripping arm carried by said body member, an offset U-shaped member carried by said body member, said body member, eyes, arm and offset U-shaped member being formed from a single piece of rod material bent to form, a rod rockably mounted in the eyes, an angularly disposed gripping arm carried by the rod, a coiled spring surrounding the rod and anchored to the body member and the last named gripping arm, a tripping plate hingedly connected to the offset U-shaped member at a right angle to the body member, said body member being provided with an angularly disposed arm in substantially the same plane as the offset U-shaped member, said rod being provided with an angularly disposed arm, a latching member carried by the angularly disposed portion of the body member and adapted to engage across the arm of the rod and a shoulder carried by the pivoted tripping plate with which the pivoted arm is adapted to engage.

2. The combination with a trap comprising an elongated body member, a rod rockably mounted in bearings carried by the body member, cooperating jaws carried by the rod and the body member, spring means cooperating with the rod and body member and normally forcing the gripping jaws together, of an offset U-shaped bend carried by the body member, a pivoted angularly disposed tripping plate carried by the offset bend, an arm carried by the body member substantially in the plane of the U-shaped bend, an arm carried by the rod and adapted to be disposed adjacent the arm carried by the body member, a tripping arm carried by the body member arm and extending across the arm of the rod, said tripping arm being provided with an angularly disposed arm, and a shoulder carried by the tripping plate and with which the angularly disposed arm of the tripping arm engages.

3. A trap comprising rockably connected rods, animal griping jaws carried by adjacent ends of said rods, spring means cooperating with the rods for forcing the jaws together, a tripping plate, arms carried by said rods, a pivoted tripping arm carried by one of said arms and adapted to engage over the arm of the other rod and engage the tripping plate.

In testimony whereof we have signed our names to this specification.

ALBERT M. PALMER, Sr.
ALBERT M. PALMER, Jr.